Figure 1:
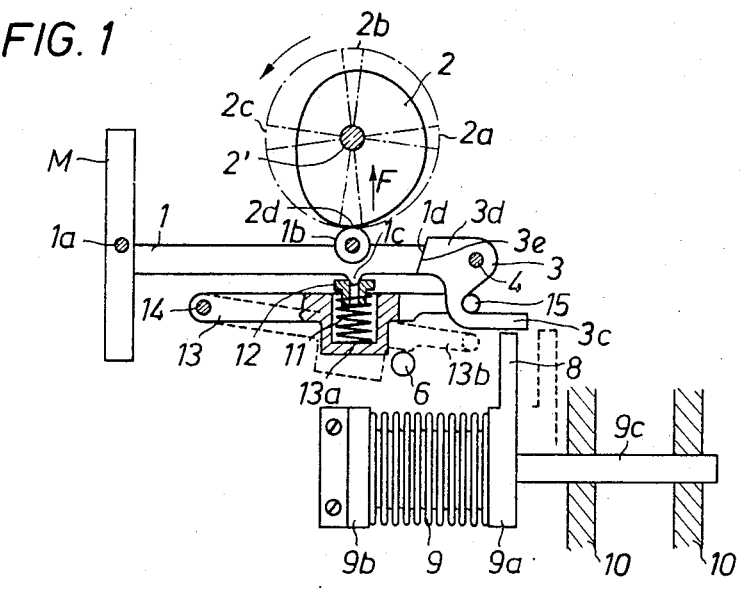

United States Patent [19]
Alessio et al.

[11] 3,820,404
[45] June 28, 1974

[54] DEVICE FOR TEMPORARILY SECURING AGAINST MOTION A MOVABLE ELEMENT WHICH IS RESILIENTLY BIASED AGAINST A WITHDRAWABLE ABUTMENT

[75] Inventors: Lucien Alessio, Bourg-les-Valence; Michel Chabanis, Chabeuil; Claude Feraud; Noel Sarret, both of Valence, all of France

[73] Assignee: Crouzet, Paris, France

[22] Filed: Nov. 9, 1972

[21] Appl. No.: 304,987

[30] Foreign Application Priority Data
Nov. 16, 1971    France..........................71.41232
Dec. 9, 1971     France..........................71.44576

[52] U.S. Cl. ........................................ 74/2, 244/155
[51] Int. Cl............................................ G05g 17/00
[58] Field of Search ................... 74/2, 3.5; 292/201; 244/155

[56] References Cited
UNITED STATES PATENTS
2,333,130  11/1943  Thomsen .......................... 74/2
2,931,231  4/1960   Felix ................................. 74/2
2,935,808  5/1960   Woodring et al. ................ 74/2 X
3,145,573  8/1964   Hebenstreit....................... 74/2
3,195,433  7/1965   Fernald............................. 74/2 X
3,503,576  3/1970   Savarieau.......................... 74/2 X
3,662,607  5/1972   Milanowksi et al............... 74/2

Primary Examiner—Allan D. Herrmann
Attorney, Agent, or Firm—Clelle W. Upchurch

[57] ABSTRACT

A device for temporarily securing against motion a movable element which is resiliently biased against a withdrawable abutment, said device comprising resiliently yieldable means interposed between the movable element and a movable bearing member, said bearing member being maintained in a position corresponding to the compression of said resiliently yieldable means, by retaining means which are subjected to the action of resiliently yieldable means which tend to cause the retaining means to release said member and to locking means which lock the retaining means in a position in which the resiliently yieldable means interposed between the movable element and the bearing member are compressed.

11 Claims, 2 Drawing Figures

DEVICE FOR TEMPORARILY SECURING AGAINST MOTION A MOVABLE ELEMENT WHICH IS RESILIENTLY BIASED AGAINST A WITHDRAWABLE ABUTMENT

The invention relates to a device for temporarily securing against motion a movable element which is resiliently biased against a withdrawable abutment. It is in particular applicable to certain movable elements carried on a rocket or like machine for the purpose of protecting these elements against the effects of intense vibrations which occur during the propulsion stage.

It is moreover often necessary to be able to try out the operation of the element which is secured against motion without necessity to unlock the securing system.

An object of the present invention is to permit the temporary securing against motion of a movable element resiliently biased against a withdrawable abutment while allowing movements for testing the element without unlocking the securing device.

The device according to the invention comprises resiliently yieldable means interposed between the movable element and a movable bearing member, said bearing member being maintained in a position of compression of said resiliently yieldable means by retaining means which are subjected to the action of resiliently yieldable means which tend to cause the retaining means to release said member and to locking means which lock the retaining means in a position in which the resiliently yieldable means interposed between the movable element and the bearing member are compressed.

In one embodiment, the retaining means comprise a pivotable member on which the support member exerts a pivoting torque under the action of resiliently yieldable means interposed between the movable element and the support member.

In a modification, the retaining means comprise a pivotal member which is locked against rotation by the support member which exerts on the pivotal member, under the action of resiliently yieldable means interposed between the support means and the support member, a force which passes through the pivot centre of the pivotal member.

Advantageously, the movable element comprises means for locking said retaining means.

The support member may be pivotable about a fixed axis. By way of a modification it may be slidable.

In the case of utilisation on a rocket, the locking means for the retaining means may be controlled by the movable end wall of a capsule containing a vacuum so that the unlocking can only occur at a predetermined altitude.

The withdrawable abutment may be constituted by a cam having a plurality of cylindrical steps and driven in rotation independently of the device, the cylindrical step of the largest radius of the cam constituting a position of rest and also a testing position of the device.

Figure 2:
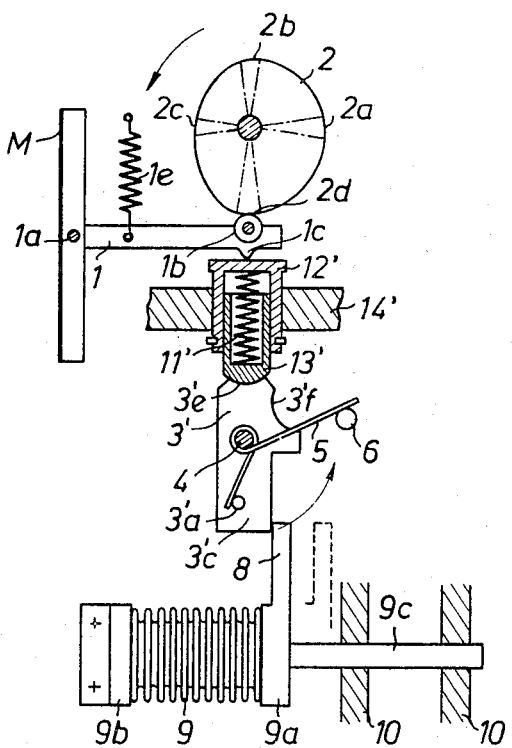

The invention will be better understood from the ensuing description with reference to the accompanying drawing in which:

FIG. 1 is a diagrammatic sectional view of a device according to the invention, and FIG. 2 is a view similar to FIG. 1 of a modification of the device.

With reference first to FIG. 1, a movable element 1 pivotable on a pin 1a is movable in the direction of arrow F, alternatively, the element 1 may be an element slidable in a direction parallel to the arrow F without departing from the scope of the invention.

In the illustrated embodiment, the movable element is a lever 1 pivotable about a pin 1a supporting an element, for example a mirror M of a measuring apparatus, and carries a follower roller 1b which co-operates with a withdrawable abutment consisting of a cam 2 having concentric steps 2a, 2b, 2c, 2d at different levels so as to give the mirror M a plurality of predetermined positions.

The element 1 is secured against motion against the cam 2 by a retaining means consisting of a trigger or trip 3 which is pivotable on a pin 4 and includes an arm 3c which bears against a locking means having the form of a finger 8 integral with the movable end wall 9a of a capsule 9 containing a vacuum whose fixed end wall 9b is integral with the support of the apparatus. A shaft 9c integral with the wall 9a is freely slidable in two bearings 10 integral with the support.

Resiliently yieldable means in the form of spring 11 bearing against a plate 12 centered on a lug 1c of the lever 1 biases this lever against the cam 2. The end of the spring 11 opposed to the plate 12 is disposed in a cavity 13a of an auxiliary lever 13 which is freely mounted on a fixed pin 14 and acts as a moveable bearing member. The end of the lever 13 opposed to the pin 14 is split so as to define a fork 13b through which a pin 15 extends. In the illustrated position, which is that corresponding to the assembly before launching, the lever 13 is maintained against the action of the spring 11 by the arm 3c of the trigger 3, which is pivotable on the fixed pin 4, this arm 3c being engaged in the fork 13b and cooperating by its upper surface with the pin 15.

As the line through the centres of the pins 15 and 4 is not perpendicular to the upper surface of the arm 3c, the trigger 3 is biased by the spring 11 to rotate in a clockwise direction. The rotation of the trigger 3 is prevented since the arm 3c is in contact with the finger 8 which is integral with the movable end wall 9c of the capsule 9.

When the apparatus is placed in a practically absolute vacuum, the capsule 9 extends and the finger 8 moves to the position shown in dotted line; the arm 3c escapes from the finger 8, the trigger 3 pivots through about a quarter of a rotation and the arm 3c comes to bear against the fixed abutment 6. The auxiliary lever 13 also encounters the abutment 6 (position shown in dotted line), the spring 11 is partially extended and the cam 2 can then rotate, it being driven in normal operation by its shaft 2' and a motor (not shown) with a low consumption of energy.

It will be understood that in the position of the arrangement shown in FIG. 1 the cam 2 at rest with its cylindrical step of largest radius 2d in alignment with the follower roller 1b, the spring 11 is stressed to the maximum extent and exerts sufficient resistance to any displacement of the lever 1 which may result from forces of inertia in the presence of vibrations.

But it will be understood that for purposes of testing operation, it is possible to cause the cam 2 to undergo a limited member of rotations, for a consumption of energy a little greater than the normal for urging the lever 1, in the course of each rotation, against the force opposed by the spring 11.

According to an advantageous feature of the invention, shown in FIG. 1, the trigger 3 has an arm 3d which terminates in an inclined plane 3e co-operating with an inclined plane 1d on the lever 1. Thus, when the cam 2 is in the position of rest in which the cylindrical step 2d of maximum radius is in alignment with the follower roller 1b, the lever 1 holds the trigger 3 in position, the arm 3c being no longer in contact with the finger 8 of the capsule 9. Under these conditions, the capsule 9, whose finger 8 is operative only during the tests of operation on the ground before launching, may be very small and consequently very light since it will extend with no appreciable friction.

When sufficient altitude has been reached, the unlocking of the trigger 3 will only occur when, after a period of time which is as long as is desired in accordance with the program, the cam 2 is made to rotate in the direction of the arrow. When the follower roller 1b reaches the cylindrical step 2c of minimum radius the plane 1d ceases to maintain the arm 3d of the trigger 3.

By way of a modification, the movable end wall 9a of the capsule 9 instead of carrying an abutment 8 acting directly on the arm 3c of the trigger 3, may carry a fork pivoted to a lever which is pivotable about a fixed axis and whose end co-operates with, or does not co-operate with the arm 3c, depending on the condition of the capsule 9.

With reference now to FIG. 2 in which the same reference characters designate the same elements as in FIG. 1, these common elements are the movable element 1, the cam 2, the trigger 3' with its pivot axis 4 and abutment 6, and the capsule 9. The movable element 1 in the illustrated embodiment is biased by a spring 1c.

A sleeve 12', which is slidable with a small axial clearance in a fixed support 14', is strongly biased against the lug 1c of the lever 1 by a spring 11', which bears, through the medium of the socket 13', in a recess 3'e in the trigger 3' which is pivotally mounted on the fixed pin 4.

A spring 5 bears against the abutment 6 and against a pin 3'a integral with the trigger 3' and tends to cause the latter to rotate in a counterclockwise direction (as viewed in the drawing).

Before launching, the trigger 3' is secured against motion in the illustrated position of the arrangement by its arm 3'c which co-operates with the finger 8 integral with the movable end wall 9a of the capsule 9 containing a vacuum.

Before launching, it is possible, for testing purposes, to rotate the cam 2 so as to impart to the movable element 1, under the action of the spring 1c, the different positions allowed by the arrangement.

After launching, as soon as the surrounding pressure has sufficiently decreased, the finger 8 assumes the position shown in dotted line in which it no longer opposes rotation of the trigger 3' under the action of the spring 5, but the rotation of the trigger 3' is prevented by the action of the socket 13' which is biased by the spring 11' into the recess 3'e.

It is only when, in accordance with the program, a first rotation of the cam 2 is brought about and the latter presents a smaller radius to the follower roller 1b, the spring 11' being then extended, that the spring 5 is capable of rotating the member 3' through about a quarter of a rotation to bring the arm 3'c against the abutment 6. In this position, the trigger 3' presents in front of the socket 13' a recess 3'f which is deeper than the recess 3'c. In this position of the trigger 3', the spring 11' no longer exerts a force, even when the cam 2 presents, in the course of the successive rotations, its largest radius to the follower roller 1b.

What I claim is:

1. A device for temporarily securing against motion a movable element (1) which is resiliently biased against a withdrawable abutment (2), said device comprising resiliently yieldable means (11) interposed between the movable element (1) and a movable bearing member (13), said bearing member (13) being maintained in a position corresponding to the compression of said resiliently yieldable means (11), by retaining means (3) which are subjected by the action of said resiliently yieldable means (11) which tend to cause the retaining means (3) to release said member (13) and to locking means (8) which lock the retaining means (3) in a position in which the said resiliently yieldable means (11) interposed between the movable element (1) and the bearing member (13) are compressed.

2. A device according to claim 1, wherein the retaining means comprise a pivotable member (3) on which the bearing member (13) exerts a pivoting torque under the action of said resiliently yieldable means (11) interposed between the movable element (1) and the bearing member (13).

3. A device according to claim 1, wherein the retaining means comprise a pivotable member (3) locked against rotation by the bearing member (13') which exerts on the pivotable member, under the action of said resiliently yieldable means (11') interposed between the movable element (1) and the bearing member (13'), a force passing through the pivot centre (4) of the pivotable member (3').

4. A device according to claim 1, wherein the movable element includes means (8) for locking said retaining means (3).

5. A device according to claim 1, wherein the bearing member (13) is pivotable about a fixed axis (14).

6. A device according to claim 1, wherein the bearing member (13') is slidable.

7. A device according to claim 1, wherein the means (8) locking the retaining means (3) is controlled by the movable end wall (9a) of a capsule containing a vacuum (9).

8. A device according to claim 1, wherein the withdrawable abutment is constituted by a cam (2) having a plurality of cylindrical steps (2a, 2b, 2c, 2d) and driven in rotation independently of the device, the cylindrical step of the cam having the largest radius (2d) constituting a position of rest and position for testing the device.

9. A device comprising a first lever, a cam disposed adjacent the lever, said first lever being movable with respect to the cam, a cam follower carried by said first lever, a second lever disposed alongside the first lever, means for pivotally fixing a first end of the second lever, bearing means fixed to the second lever, means for biasing the bearing means against the first lever and press the cam follower against the cam, and means for releasably securing the second lever with the bearing member against the first lever comprising a pivotally mounted trigger carried by said second lever and an evacuated extensible capsule fixed at one end against movement and carrying means at its opposite end for engaging said trigger while unextended.

10. The device of claim 9 wherein said first lever has a sloping end, said second lever has a cavity therein and a forked end opposite its fixed end with a pin fixed between the forks, said bearing means is diposed in the cavity, said means for biasing the bearing member against the first lever and to press the cam follower against the cam is a spring disposed in the cavity, and the means for releasably securing the second lever is a generally Z-shaped trigger means pivotally fixed and comprising a first arm terminating in a sloping end adapted to engage the sloping end of the first lever when pivoted into a position with its axis lying in the same plane as the axis of the first lever, a second arm in a plane substantially parallel to the axis of the first arm and joined to the first arm by a connecting portion disposed between the forks of the second lever and having a slanting edge which joins the upper edge of the second arm at a radius adapted to fit about the said pin carried between the said forks, said pin between the forks being disposed nearer than the pivot point of the trigger means to the pivot end of the second lever, and means for supporting the trigger means with the sloping end of the first arm engaging the sloping end of the first lever comprising a capsule fixed at one end and adapted to extend longitudinally under vacuum and carrying on its opposite end means for removably supporting while unextended said second arm in a position with its axis substantially parallel to the axis of the first lever.

11. The device of claim 9 wherein a spring biases said first lever towards the cam, said second lever has a cavity therein, said bearing member is a first cup-shaped member slidably disposed in the cavity with its closed end facing said second lever, a spring in the cavity biasing the first cup-shaped member towards the first said lever, and said means for releasably securing the second lever comprises a second cup-shaped member disposed in said first cup-shaped member about the spring and having an arcuate shaped closed end outside the cavity, a trigger having an edge with an arcuate shaped recess adapted to engage the arcuate shaped end of the second cup-shaped member, said trigger being pivotally mounted on a pin, a pin carried by the trigger, a fixed abutment pin adjacent to the trigger, a wire spring about the pivot pin of the trigger and having one arm bearing against said abutment and the other arm against the pin carried by the trigger, and means for releasably securing the trigger against pivoting by the wire spring which comprises a capsule fixed at one end and adapted to extend longitudinally under vacuum and carrying on its opposite ends means for engaging said trigger while unextended and to be moved from engagement when the capsule is extended.

* * * * *